(12) United States Patent
Yoon et al.

(10) Patent No.: US 7,726,866 B2
(45) Date of Patent: Jun. 1, 2010

(54) BACKLIGHT REFLECTION PLATE AND BACKLIGHT MODULE

(75) Inventors: Daekeun Yoon, Beijing (CN); Sangjig Lee, Beijing (CN); Chulyoun Kim, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 12/125,236

(22) Filed: May 22, 2008

(65) Prior Publication Data

US 2009/0067195 A1    Mar. 12, 2009

(30) Foreign Application Priority Data

Sep. 10, 2007   (CN) .................. 2007 1 0121551

(51) Int. Cl.
*F21V 7/04* (2006.01)
(52) U.S. Cl. ...................................... 362/623; 362/625

(58) Field of Classification Search ................. 362/617, 362/619, 621, 622, 623, 625
See application file for complete search history.

(56) References Cited

U.S. PATENT DOCUMENTS

| | | | | |
|---|---|---|---|---|
| 5,134,549 A | * | 7/1992 | Yokoyama | 362/623 |
| 5,386,347 A | * | 1/1995 | Matsumoto | 362/623 |
| 6,776,494 B2 | * | 8/2004 | Fujino et al. | 362/600 |
| 7,441,936 B2 | * | 10/2008 | Liao | 362/626 |

* cited by examiner

*Primary Examiner*—John A Ward
(74) *Attorney, Agent, or Firm*—Ladas & Parry LLP

(57) ABSTRACT

Disclosed is a backlight reflection plate and a backlight module using the reflection plate. The reflection plate encloses a light source. The reflection plate comprises a reflection substrate with a surface facing the light source. The reflection plate comprises a first region close to one end of the light source with a higher brightness and a second region close to the other end of the light source with a lower brightness. The reflectivity of the first region is smaller than that of the second region.

16 Claims, 3 Drawing Sheets

BACKLIGHT REFLECTION PLATE AND BACKLIGHT MODULE

BACKGROUND OF THE INVENTION

The embodiment of the present invention relates to a liquid crystal display (LCD) backlight module.

A backlight module is a device for converting a linear light source into a surface light source with high brightness and high uniformity. A conventional LCD backlight module is shown in FIGS. 1A and 1B, for example. The backlight module comprises a bottom reflection plate 10, a light guide plate 11 on the bottom reflection plate 10 to convert a linear light source into a surface light source, an upper diffusion sheet 15 and a lower diffuse plate 12 to diffuse the light from the light guide plate 11, an upper prism sheet 14 and a lower prism sheet 13 to condense the light from the lower diffuse plate 12, a light source 16 disposed on both sides of the light guide plate 11, and a backlight reflection plate 17 enclosing the light source 16 to reflect the light back into the light guide plate 11.

In operation of the LCD, the light emitted from the light source 16 such as a cold cathode fluorescence light (CCFL) is reflected back into the light guide plate 11 by the backlight reflection plate 17 to form a surface light source applicable for the LCD. The reflection plate 17 is typically in a "C" shape in cross-section enclosing the light source 16 to reflect the light into the light guide plate 11, as shown in FIG. 2. FIG. 3 is a cross-sectional view taken along line A-A in FIG. 2. As shown in FIG. 3, the sectional shape of the reflection plate 17 is a rectangle with a uniform thickness. The reflectivity of the backlight reflection plate 17 is uniform throughout the plate.

When a CCFL is used as the light source for the backlight module, there is a brightness difference between a positive electrode and a negative electrode at the opposing ends of the CCFL. FIG. 4 is a schematic view showing a simulation of brightness value distribution on a LCD panel using a CCFL as the light source with a positive electrode 2 and a negative electrode 3, in which the brightness value in a specific box is an average value within the box. As shown in FIG. 4, the brightness value at a region close to the positive electrode 2 of the light source is higher than the brightness value at a region close to the negative electrode 3 of the light source, which adversely affects display quality of the LCD.

SUMMARY OF THE INVENTION

In an aspect of the present invention, there is provided a backlight reflection plate, which can improve uniformity of light incident into a light guide plate, thus improving display quality of a liquid crystal display (LCD).

In another aspect of the present invention, there is provided a backlight module which can improve uniformity of light incident into the light guide plate from a light source, and reduce an adverse effect due to brightness difference between two ends of the light source such as a CCFL, thus improving the illumination uniformity of the backlight module, as well as display quality of a LCD.

In an embodiment of the invention, there is provided a backlight reflection plate enclosing a light source. The reflection plate comprises a reflection substrate with a surface facing the light source. The reflection plate comprises a first region close to one end of the light source with a higher brightness and a second region close to the other end of the light source with a lower brightness. The reflectivity of the first region is smaller than that of the second region.

In another embodiment of the invention, there is provided a backlight module. The backlight module comprises a light guide plate, a light source disposed on at least one side of the light guide plate, and a backlight reflection plate enclosing the light source. The reflection plate comprises a reflection substrate with a surface facing the light source. The reflection plate comprises a first region close to one end of the light source with a higher brightness and a second region close to the other end of the light source with a lower brightness. The reflectivity of the first region is smaller than that of the second region.

In further another embodiment of the invention, there is provided a backlight module, comprising a light guide plate, a light source disposed on at least one side of the light guide plate; and a backlight reflection plate enclosing the light source. The backlight reflection plate comprises a reflection substrate with a surface facing the light source. The light source comprises a positive electrode and a negative electrode at opposing ends with the end of the positive electrode being brighter than the end of the negative electrode, the reflection plate comprises a first region close to the positive electrode of the light source and a second region close to the negative electrode of the light source, and the reflectivity of the first region is smaller than that of the second region.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

First Embodiment

Figure 1A:
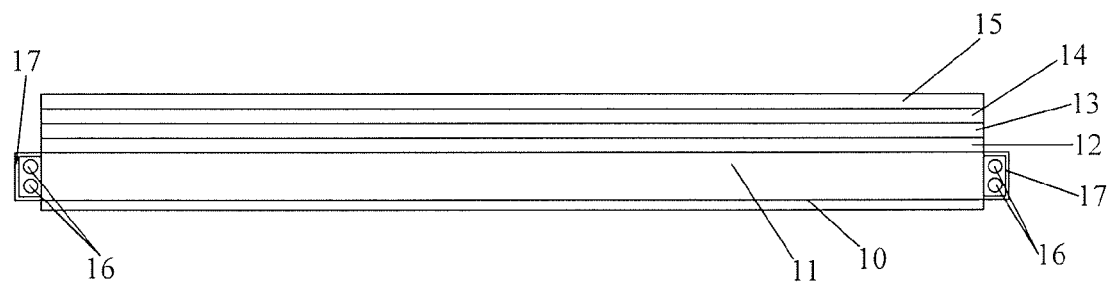
FIG. 1A is a schematic view illustrating a conventional LCD backlight module.
Figure 1B:
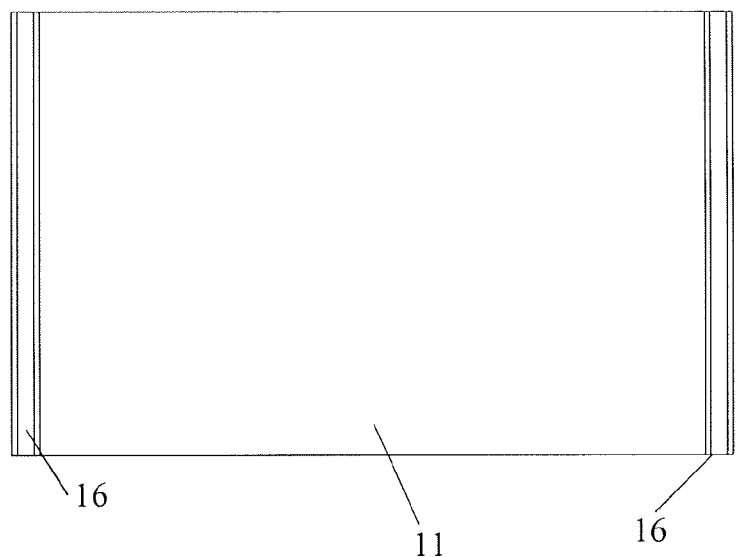
FIG. 1B is a plan schematic view illustrating a conventional LCD backlight module.
Figure 2:
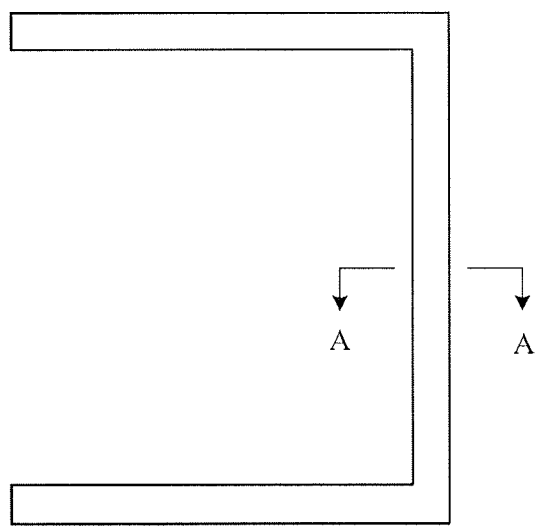
FIG. 2 is a side schematic view illustrating a conventional backlight reflection plate.
Figure 3:
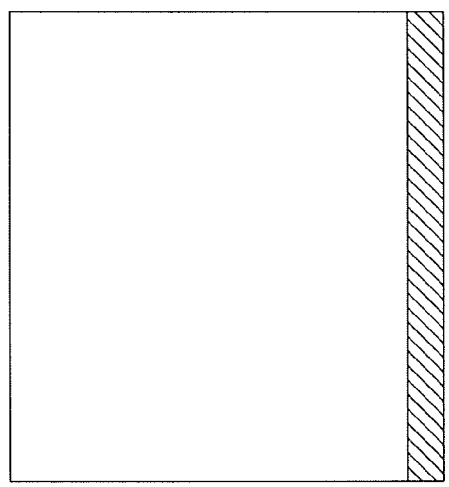
FIG. 3 is a cross-sectional view taken along line A-A in FIG. 2.
Figure 4:
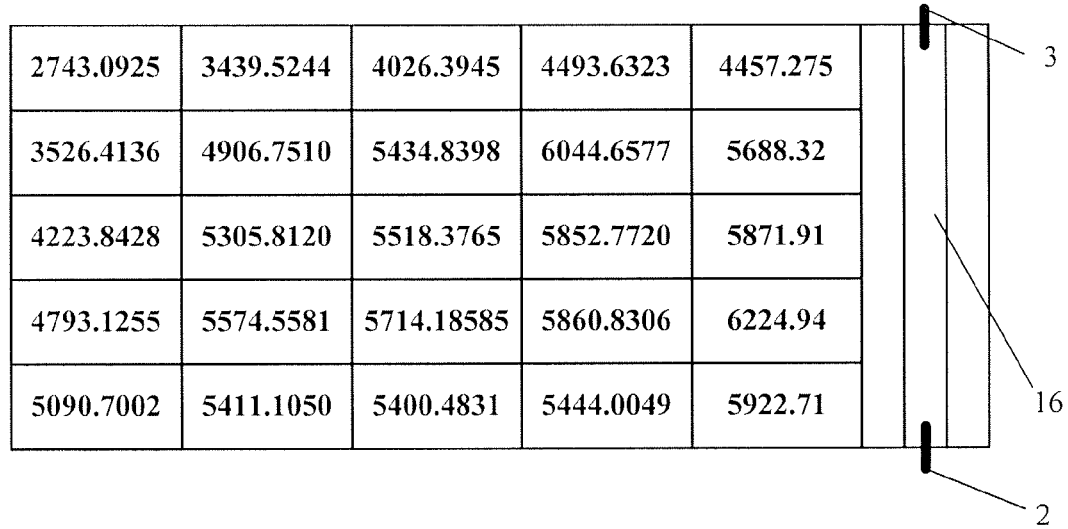
FIG. 4 is a schematic view showing a simulation of brightness value distribution on a LCD panel.
Figure 5A:
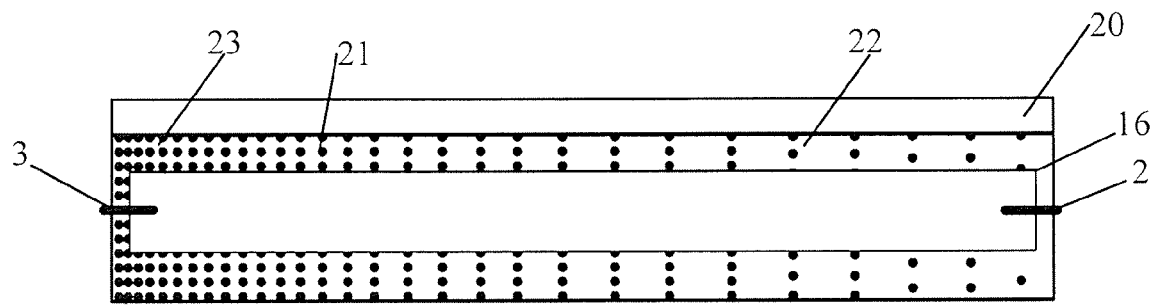
FIG. 5A is a schematic view showing a backlight reflection plate of a LCD backlight module according to an embodiment of the invention.
Figure 5B:
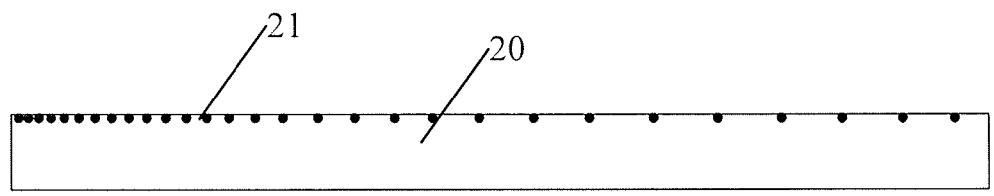
FIG. 5B is a schematic cross-sectional view showing a backlight reflection plate of a LCD backlight module according to an embodiment of the invention.

FIG. 5A is a schematic view showing a backlight reflection plate of a LCD backlight module according to a first embodiment of the invention. As shown in FIG. 5A, the backlight reflection plate encloses a light source 16 to reflect the light from the light source 16 into a light guide plate. The light source 16 can comprise a positive electrode 2 and a negative electrode 3 disposed at opposing ends respectively. The backlight reflection plate comprises a reflection substrate 20, which can be formed of metals such as Ag, Cu, Au etc. or compounds such as $BaSO_4$, $CaCO_3$, etc. by deposition. The surface of the reflection substrate 20 facing the light source 16 can comprise a first region 22 close to the positive electrode 2 of the light source 16 and a second region 23 close to the negative electrode 3 of the light source 16. Reflection deposit 21 such as metal deposit is formed on the surface of the reflection substrate 20 with a density gradually increasing in a direction from the first region 22 towards the second region 23, as shown in FIG. 5B, which is a schematic cross-sectional view showing a backlight reflection plate of a LCD backlight module according to an embodiment of the invention. The metal deposit 21 can be formed of a material with relative high reflectivity such as silver (Ag), for example. The deposit 21 can be also formed of other material as long as the reflectivity of such material is higher than the reflectivity of the reflection substrate 20.

In this case, the reflectivity of the reflection plate in the second region 23 is higher than the reflectivity of the reflection plate in the first region 22. Since the brightness of the light source 16 corresponding to the first region 22 is higher than that corresponding to the second region 23, the overall uniformity of the light into the light guide plate 11 can be improved by rendering the reflectivity of a portion of the backlight reflection plate where the brightness of the light source 16 is low higher than that where the brightness of the light source is high. Furthermore, the overall reflectivity of the backlight reflection plate can be improved by depositing a material with a reflectivity higher than the reflection substrate 20. For example, the reflectivity of the reflection plate can be improved by at least 1% by depositing a high reflectivity material. In this case, the increment of the reflectivity is not uniform across the reflection plate with a higher increment in the second region 23 compared with the increment in the first region 22, thus compensating the brightness difference of the light source while improving the overall brightness of the backlight module.

In another implementation of the first embodiment, the difference in reflectivity between the first region 22 and the second region 23 can be also obtained by depositing for example a metal with a relatively high reflectivity only at the second region 23. The density of the metal deposit can be uniform within the second region 23 or gradually increase in a direction from the positive electrode towards the negative electrode of the light source 16. In this case, the reflection plate can have reflectivity difference to compensate the brightness difference of the light source, while reducing the consumption of the expensive high reflectivity metal to lower the material and producing cost.

Alternatively, a material with a lower reflectivity than that of the reflection substrate 20 can be deposited on the surface of the reflection substrate 20. The density of the low reflectivity deposit in the second region 23 can be smaller than that in the first region 22, or the low reflectivity material is deposited only in the first region 22. Thus the reflection plate can have reflectivity difference between the two regions 22 and 23 to compensate the brightness difference of the light source in the two regions, while the brightness of the backlight module can be adjusted based on specific requirements.

Alternatively, there can be other ways to create the reflectively difference in the reflection substrate 20 in an embodiment of the invention. For example, the reflectivity of the reflection plate 20 can also depend on the smoothness of the surface facing the light source. Therefore, the reflectivity difference of the reflection plate can be also created by changing the surface smoothness of the reflection substrate 20.

In the above implementations, the reflectivity difference of the reflection plate depends on the density difference of the deposit, for example. It is preferable that the reflectivity difference corresponding to opposing ends of the light source is about 10%, so that the density difference of the deposit between the first and the second regions is in proportion to the brightness difference of the corresponding ends of the light source. Based on the simulation result of the above implementations, the brightness difference of the light incident into the light guide plate can be reduced to 13%, preferably 9.4%. The material with either a high reflectivity or a low reflectivity can be applied to the reflection substrate by methods other than deposition, such as coating, spraying, plating, chemical vapor deposition (CVD), physical vapor deposition (PVD), etc.

Second Embodiment

Figure 6A:
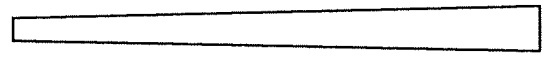
FIG. 6A is a schematic view showing a backlight reflection plate of a LCD backlight module according to another embodiment of the invention.

FIG. 6A is a schematic view showing a backlight reflection plate of a LCD backlight module according to the second embodiment of the invention. In the present embodiment, the backlight reflection plate can be formed of polymers such as polyethylene terephthalate (PET) with a cross sectional shape of trapezoid as shown in FIG. 6A. The reflection plate comprises a first region close to a positive electrode of a light source and a second region close to a negative electrode of the light source, with the thickness of the reflection plate gradually increasing from the first region towards the second region.

Due to light absorption by a material layer disposed on the rear surface of the reflection plate, a portion of the reflection plate with a relatively small thickness can have a lower reflectivity compared with a portion of the reflection plate with a larger thickness. That is, the reflectivity of the reflection plate increases with the thickness of the reflection plate. Therefore, the reflectivity of the first region with a small thickness is lower than the reflectivity of the second region with a relatively large thickness to compensate the brightness difference between the two regions, thereby improving the uniformity of the light entering the light guide plate.

Figure 6B:
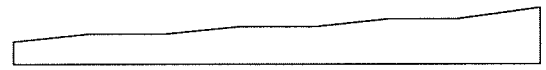
FIG. 6B is a schematic view showing a backlight reflection plate of a LCD backlight module according to another embodiment of the invention.
Figure 6C:
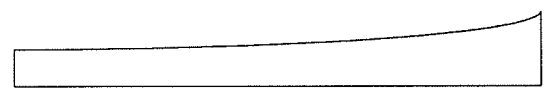
FIG. 6C is a schematic view showing a backlight reflection plate of a LCD backlight module according to another embodiment of the invention.

Alternatively, the cross-sectional shape of the backlight reflection plate can be in other shapes, such as a step-like shape or a trapezoid-like shape with a curve side, as shown in FIGS. 6B and 6C, respectively.

The technical features of the first embodiment and the second embodiment can also be combined as necessary, as long as a reflectivity difference is formed in the reflection plate to compensate the brightness difference of the light source.

Figure 7:
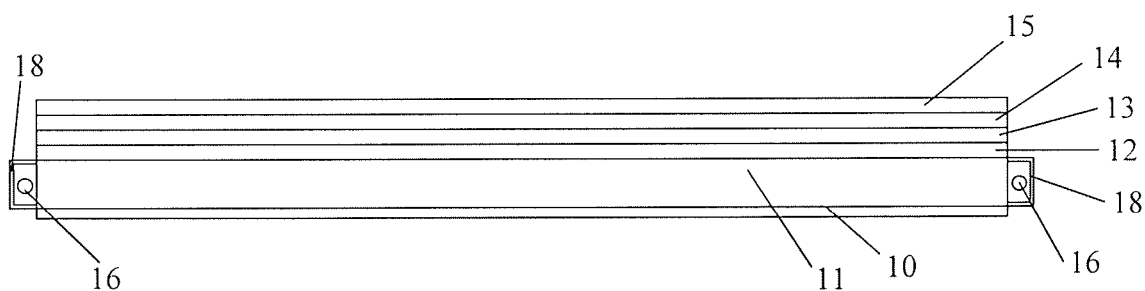
FIG. 7 is a schematic view illustrating a LCD backlight module according to an embodiment of the invention.

The backlight reflection plate according to the above embodiments can be also applied to a LCD backlight module according to an embodiment of the invention. FIG. 7 is a schematic view illustrating a LCD backlight module according to an embodiment of the invention. As shown in FIG. 7, the backlight module comprises a bottom reflection plate 10, a light guide plate 11 on the reflection plate 10 to convert a linear light source into a surface light source, an upper diffusion sheet 15 and a lower diffuse plate 12 to diffuse the light from the light guide plate 11, a upper prism sheet 14 and a lower prism sheet 13 to condense the light from the lower diffuse plate 12, a light source 16 disposed on both sides of the light guide plate 11, and a backlight reflection plate 18 enclosing the light source 16 to reflect the light back into the light guide plate 11. The optical sheets such as the upper and lower diffuse plates 15 and 12, the upper and lower prism plates 14 and 13 can be added or omitted based on the specific requirements. The backlight module can also comprise other components such as a support frame. The backlight reflection plate 18 can be any type of reflection plates set forth in the above embodiments. Alternatively, the light source 16 is disposed on only one side of the light guide board 11.

In the backlight module according to the embodiment of the invention, there is a difference in reflectivity between the region close to the positive electrode and the region close to the negative electrode of the light source on the backlight reflection plate, thus compensating light intensity difference between two ends of the light source and improving the illumination uniformity of the backlight module and improving the display quality of the LCD. The light module according to the embodiment of the invention can meet T003 (The Swedish Confederation of Professional Employees) standard, that is, the brightness value regions of a LCD backlight measured from different angles are consistent with each other, therefore the surface uniformity of brightness of the backlight is improved.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A backlight reflection plate enclosing a light source, comprises a reflection substrate with a surface facing the light source, wherein the reflection plate comprises a first region close to one end of the light source with a higher brightness and a second region close to the other end of the light source with a lower brightness, and the reflectivity of the first region of the reflection plate is smaller than that of the second region of the reflection plate.

2. The backlight reflection plate according to claim 1, wherein a deposit is formed on the reflection substrate in the first region and the second region with the reflectivity of the deposit being greater than the reflectivity of the reflection substrate, and a density of the deposit in the first region is lower than that in the second region.

3. The backlight reflection plate according to claim 2, wherein the density of the deposit increases gradually in a direction from the first region towards the second region.

4. The backlight reflection plate according to claim 2, wherein the deposit is formed of a metal.

5. The backlight reflection plate according to claim 1, wherein a deposit is formed only in the second region but none in the first region with the reflectivity of the deposit being greater than the reflectivity of the reflection substrate.

6. The backlight reflection plate according to claim 1, wherein a deposit is formed on the reflection substrate in the first region and the second region with the reflectivity of the deposit being lower than the reflectivity of the reflection substrate, and a density of the deposit in the first region is higher than that in the second region.

7. The backlight reflection plate according to claim 6, wherein the density of the deposit decreases gradually in a direction from the first region towards the second region.

8. The backlight reflection plate according to claim 1, wherein a deposit is formed only in the first region but none in the second region with the reflectivity of the deposit being lower than the reflectivity of the reflection substrate.

9. The backlight reflection plate according to claim 1, wherein a thickness of the reflection plate in the first region is smaller than a thickness of the reflection plate in the second region.

10. The backlight reflection plate according to claim 9, wherein a thickness of the reflection plate increases gradually in a direction from the first region towards the second region.

11. The backlight reflection plate according to claim 9, wherein the reflection plate is in a cross-sectional shape selected from the group consisting of a trapezoid shape, a step-like shape, and a trapezoid-like shape.

12. The backlight reflection plate according to claim 9, wherein the reflection plate is formed of polyethylene terephthalate (PET).

13. A backlight module, comprising:
a light guide plate;
a light source disposed on at least one side of the light guide plate; and
a backlight reflection plate enclosing the light source, comprising a reflection substrate with a surface facing the light source, wherein the reflection plate comprises a first region close to one end of the light source with a higher brightness and a second region close to the other end of the light source with a lower brightness, and the reflectivity of the first region of the reflection plate is smaller than that of the second region of the reflection plate.

14. The backlight module according to claim 13, further comprising at least one diffuse plate and at least one prism plate on the light guide plate.

15. The backlight module according to claim 13, further comprising a bottom reflection plate below the light guide plate.

16. A backlight module, comprising:
a light guide plate;
a light source disposed on at least one side of the light guide plate; and
a backlight reflection plate enclosing the light source, comprising a reflection substrate with a surface facing the light source,
wherein the light source comprises a positive electrode and a negative electrode at opposing ends with the end of the positive electrode being brighter than the end of the negative electrode, and
wherein the reflection plate comprises a first region close to the positive electrode of the light source and a second region close to the negative electrode of the light source, and the reflectivity of the first region of the reflection plate is smaller than that of the second region of the reflection plate.

* * * * *